United States Patent [19]

Galaniuk et al.

[11] Patent Number: 4,751,835

[45] Date of Patent: Jun. 21, 1988

[54] METHOD OF MANUFACTURING VARIABLE DIAMETER DRIVESHAFT

[75] Inventors: Alexander H. Galaniuk, Dearborn; Georg W. Somborn, Canton, both of Mich.

[73] Assignee: Ford Motor Company, Dearborn, Mich.

[21] Appl. No.: 48,118

[22] Filed: May 11, 1987

Related U.S. Application Data

[62] Division of Ser. No. 318,669, Nov. 5, 1981, abandoned.

[51] Int. Cl.[4] .............................................. B21D 22/12
[52] U.S. Cl. ........................................... 72/62; 72/60; 29/421 R
[58] Field of Search .......................... 72/54, 60, 61, 62; 29/421 R

[56] References Cited

U.S. PATENT DOCUMENTS

| | | |
|---|---|---|
| 1,000,574 | 8/1911 | Bauroth .................................. 72/62 |
| 1,700,867 | 2/1929 | Wolfe . |
| 1,734,268 | 11/1929 | Moorhouse . |
| 2,380,952 | 8/1945 | Dewey . |
| 2,742,873 | 4/1956 | Moore ..................................... 72/62 |
| 3,229,488 | 1/1966 | Smith . |
| 3,383,901 | 5/1968 | Stalter . |
| 3,659,434 | 5/1972 | Wolfe . |
| 3,685,327 | 8/1972 | Nakamura . |

FOREIGN PATENT DOCUMENTS

| | | |
|---|---|---|
| 576055 | 11/1931 | Fed. Rep. of Germany . |
| 2107460 | 8/1972 | Fed. Rep. of Germany .......... 72/62 |
| 17132 | 2/1981 | Japan ..................................... 72/62 |

Primary Examiner—David Jones
Attorney, Agent, or Firm—Peter D. McDermott; Roger L. May

[57] ABSTRACT

A driveshaft for a motor vehicle having a double tapered tubular body with its largest diameter near its midpoint and its least diameter adjacent its opposite ends. The body is substantially and continuously tapered from the midpoint to each of the ends. The tapered section of the tubular body has its outer surface positioned near a surface defined by a parabola revolved about the longitudinal axis of the body. The parabola has its apex at the midpoint of the driveshaft and intersects two points on the longitudinal axis at approximately the mounting planes where the driveshaft is supported at its ends. In addition, a method of manufacturing the tapered tubular body of the driveshaft includes a mold having a tapered wall section and cylindrical shaped end sections to receive the cylindrical tube. The cylindrical tube is able to receive varying lengths of elastomeric plugs which can be sequentially compressed to deform the tube outwardly to abut the tapered wall section of the mold.

5 Claims, 7 Drawing Sheets

METHOD OF MANUFACTURING VARIABLE DIAMETER DRIVESHAFT

This is a division of application Ser. No. 318,669, filed Nov. 5, 1981, now abandoned.

BACKGROUND OF THE INVENTION

1. Field of the Invention

This invention relates to driveshafts for motor vehicles.

2. Disclosure Information

Driveshafts connecting a forwardly mounted engine-transmission unit with a rear differential usually have a cylindrically shaped tubular body with swaged ends sized to be connected to universal joints. The tubular body dimensions are dictated by the maximum torque and the maximum rotational speed encountered by the driveshaft for the particular motor vehicle. The minimum diameter of an automotive driveshaft is primarily dictated by its minimum critical speed requirement. The minimum critical speed is defined as the minimum speed that damages the driveshaft. Consequently, the minimum critical speed must be higher than the maximum encountered rotational speed.

The driveshaft's minimum critical speed is a function of its bending moment of inertia. The bending moment of inertia increases toward the center of the tubular body as the square of the distance from the two supported ends. As a consequence of an increasing bending moment, the flexural rigidity of the driveshaft (i.e. the rigidity of the driveshaft with respect to deflection in bending) decreases toward the longitudinal center of the tubular body.

Because the flexural rigidity decreases toward the midpoint of the tubular body the necessary minimum shaft diameter has traditionally been calculated at this midpoint position. However, a cylindrically shaped tubular body with a diameter based upon the requirements at the midpoint position is actually larger and heavier than necessary. Because the flexural rigidity increases from the midpoint toward the ends of the body the diameter of the tubular body can conversely decrease from the midpoint toward the thickest section adjacent the ends of the body and the thinnest section near the longitudinal midpoint of the body. The thickness of the wall varies along the length of the body in an inverse relation with respect to the varying ends thereof. What is needed is a variable diameter driveshaft that has its largest diameter near its midpoint and is tapered down toward its ends over a substantial length of the driveshaft to maximum the strength and flexural rigidity of the driveshaft compared to its weight.

One typical driveshaft is disclosed in U.S. Pat. No. 3,659,434 issued to Wolf on May 2, 1972. The Wolf patent discloses a driveshaft with swaged ends to receive conventional U-joint yokes. The driveshaft has a middle cylindrical section and a short tapered section connecting the swaged ends to the middle cylindrical section. The interior of the driveshaft is filled with polyurethane foam.

SUMMARY OF THE INVENTION

In accordance with the invention, a driveshaft has a variable diameter tubular body with its largest diameter at its longitudinal midpoint and its smallest diameter adjacent its opposite ends. The tubular body is substantially continuously tapered from a location adjacent one of the ends to a location adjacent the other of the ends.

Preferably, the tubular body has a linear taper. The tapered surface is positioned near a surface of revolution of a parabola. The surface of revolution of a parabola is defined in part by a revolution of a parabola with its apex positioned approximately near the longitudinal midpoint of the body and coincidental with the outer diameter of said tubular body at the longitudinal midpoint. In addition, the parabola has two points that interact the axis of rotation of the body near transverse planes that intersect the two end supports for the driveshaft.

Furthermore, it is preferable that the tubular body has a wall of progressively varying thickness with the diameters of the circular cross-sections at different points along the longitudinal axis of the tubular body.

The invention also includes a method of manufacturing the above-described driveshaft. The method includes the steps of: placing a cylindrical metal tube in a mold having a double tapered mold wall that tapers from a larger diameter middle location to opposite lesser diameter cylindrical end sections; positioning an elastomeric deformable plug within the tube; and compressing the plug to force the plug to expand radially and thereby force the middle portion of the metal tube to bulge outwardly toward the mold wall.

Preferably, the elastomeric deformable plug is substantially shorter than the double tapered mold wall and the metal tube is bulged outward partly to the mold wall. A longer elastomeric deformable cylindrical plug is preferably placed in the tube after removal of the first plug and compressed to cause further bulging of the tube outwardly until the tube abuts the tapered mold wall.

BRIEF DESCRIPTION OF THE DRAWINGS

The invention now will be described with reference to the accompanying drawings in which.

DETAILED DESCRIPTION OF THE PREFERRED EMBODIMENT

Figure 1:
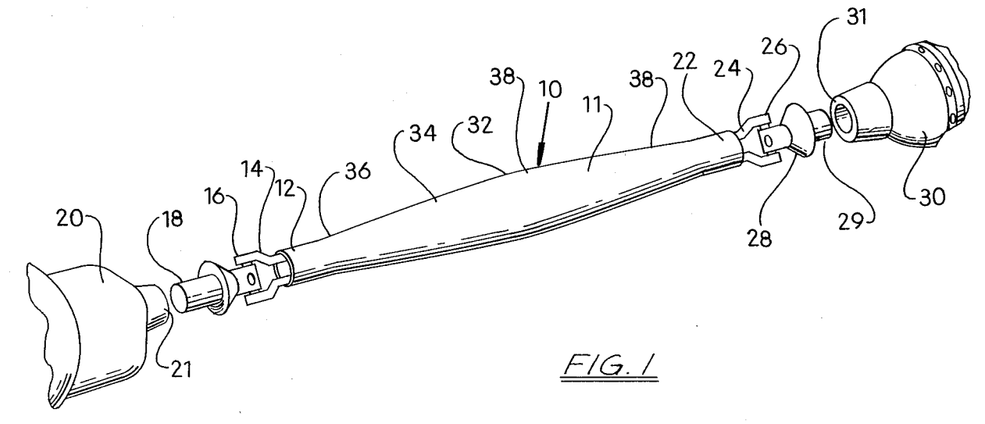
FIG. 1 is a perspective and exploded view of a drive-train for a motor vehicle having a driveshaft constructed in accordance with the invention.
Figure 9:
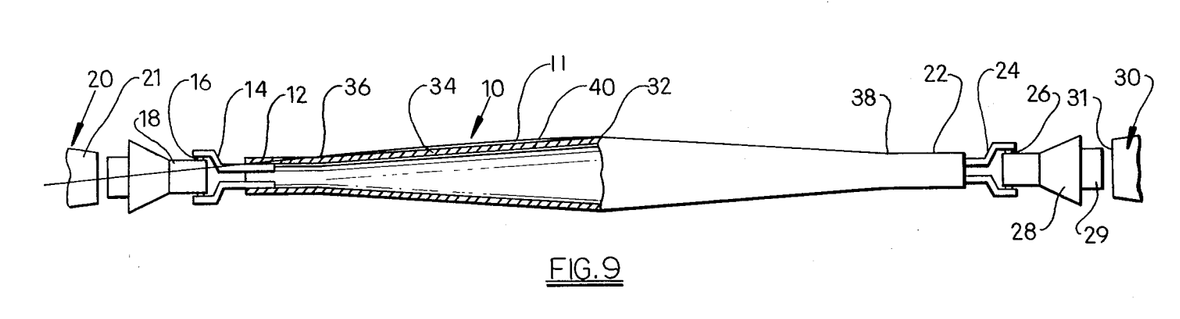
FIG. 9 is a side elevational and partially segmented view of the driveshaft shown in FIG. 1 with its profile compared with a segment of a parabola.

Referring now to FIGS. 1 and 9, a driveshaft assembly 10 includes a tubular body 11 that has a front end 12 welded to a yoke 14 which, in turn, is connected to a slip yoke 18 to form a universal joint 16. The slip yoke is operably connected to a transmission 20. The transmission has an annular flange 21 which supports the front of the driveshaft assembly 10.

The rear end 22 of the driveshaft body 11 is welded to a yoke 24 which is operably connected to a complementary yoke 28 to form a universal joint 26. The yoke 28 is connected to a stub shaft 29 which is operably conected to a rear differential 30. The rear differential 30 has a flange 31 which supports the rear of the driveshaft assembly 10.

The driveshaft tubular body 11 has a double tapered midsection 34 with its largest diameter at its mid-point 32. The midsection 34 is continuously tapered down to the end sections 12 and 22. The end sections 12 and 22 and the double tapered middle section 34 merge at transition sections 36 and 38. The tubular body 11 has a cross-section that is circular in shape in any plane perpendicular to its longitudinal axis. The diameters of axially displaced cross-sections increase along tapered section 34 to midpoint 32 where the circular cross-section has the largest diameter.

Figure 10:
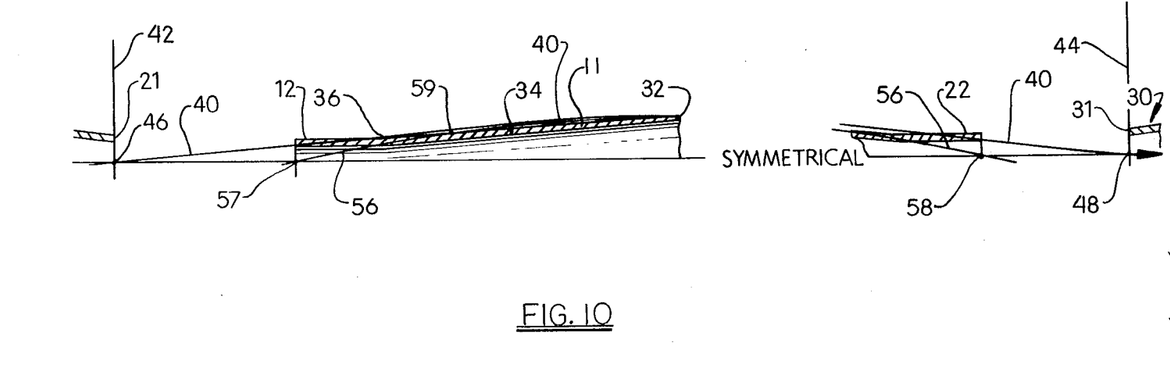
FIG. 10 is fragmented side elevational view of the tubular body of the driveshaft shown in FIG. 1 and the end supports of the transmission and differential comparing, in an exaggerated manner, the driveshaft body profile with a segment of a parabola.

Referring now to FIGS. 9 and 10 for further details, the double tapered section 34 of the body 11 has a linear taper from its midpoint 32 to the transition section 36 and a linear taper from midpoint 32 to transition section 38. The midpoint 32 and transition sections 36 and 38 intersect a surface defined by rotating a parabola, indicated by numeral 40, about the axis of rotation of the driveshaft. Cylindrical end sections 12 and 22 extend from the intersection of the parabola 40 with the body 11 at the transition sections 36 and 38. The end sections 12 and 22 consequently have larger radii than the radii of the parabolic surface at end sections 12 and 24. The parabola 40 has its apex coincidental with midpoint 32 and intersects the axis of rotation at points 46 and 48 within two planes indicated as 42 and 44. The planes 42 and 44 intersect the ends of support flanges 21 and 31. Each plane 42 and 44 is perpendicular to the longitudinal axis of the tubular body.

As shown in FIG. 10, the driveshaft body 11 has a wall thickness that is greater at end 12 and progressively lessens toward mid-point 32. Similarly, the wall thickness becomes greater at end 22. The wall thickness of body 11 is inversely dependent upon the varying diameters of the body 11 measured at axially displaced planes that are perpendicular to the longitudinal axis of the body.

The tapered section 34 can also be defined in terms of a parabola 56 defined by its apex at mid-point 32 and its points 57 and 58 intersecting the axis of the tubular body at the end of the body 11. The parabola 56 intersects the outer diameter of tapered section 34 at a point 59 as well as midpoint 32. The parabola 56 is easier to measure since its intersection point with the axis of revolution is aligned with the ends of body 11 and is independent of the position of support flanges 21 and 31. The parabola 56 has a surface of revolution approximate the surface of parabola 40.

Figures 11, 12:
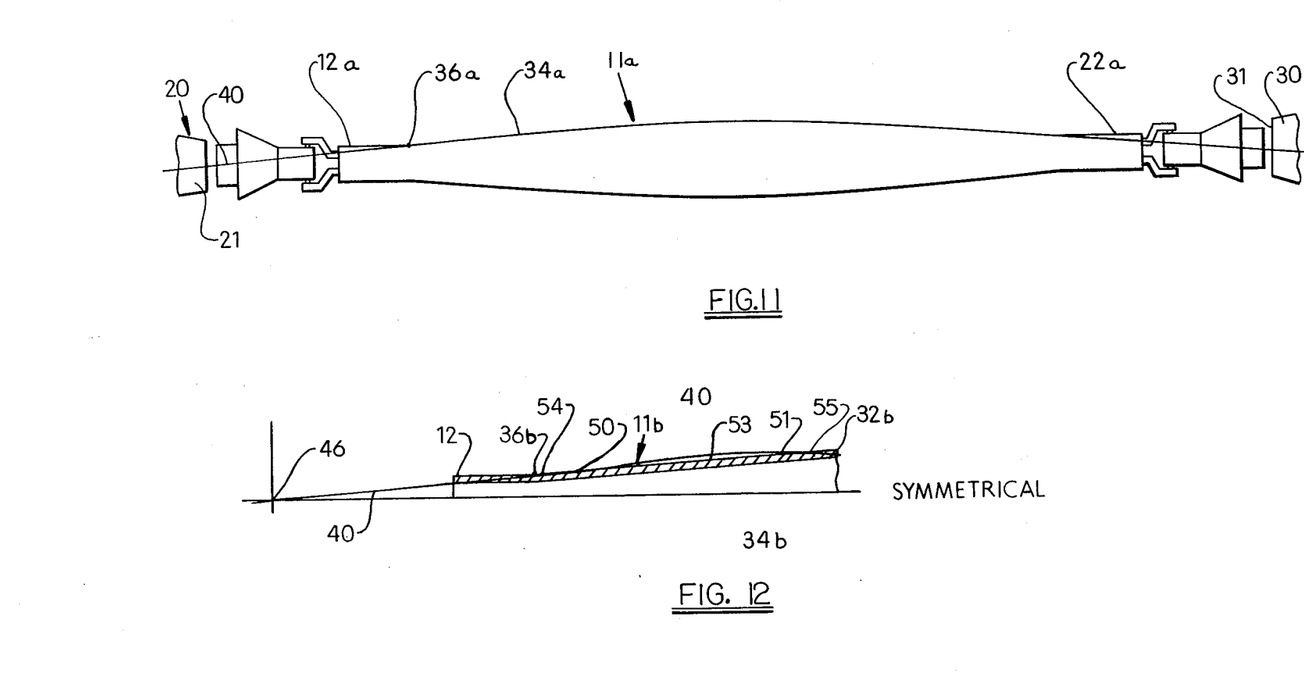
FIG. 11 is a side elevational view of a second embodiment of a driveshaft according to the invention.
FIG. 12 is a view similar to FIG. 10 illustrating the linear tapered profile of a third embodiment of the driveshaft body.

A second embodiment is shown in FIG. 11. The tubular body 11a has a tapered section 34a being parabolically tapered as defined by the parabola 40. The cylindrical end sections 12a and 22a have the same diameter and length.

Figure 13:
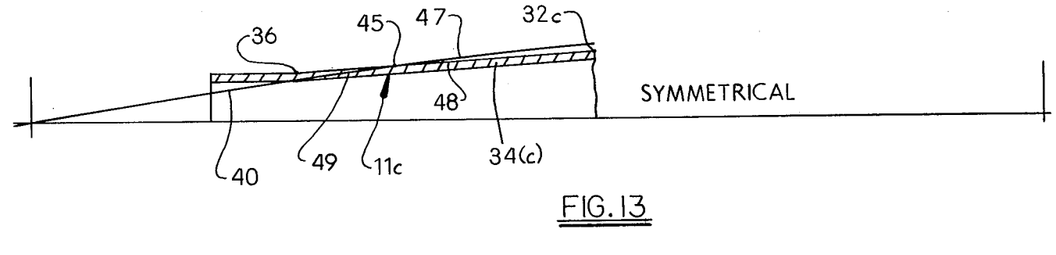
FIG. 13 is a view similar to FIG. 10 illustrating the linear tapered profile of a fourth embodiment of the driveshaft body.

FIGS. 12 and 13 show two other embodiments with linear tapered surfaces that lie near the surface of revolution of parabola 40. FIG. 12 schematically shows a profile of a third embodiment which has the outer diameter of the tubular body 11b intersect the defined parabola 40 at points 50 and 51 which are between the midpoints 32b and transition point 36b of body 11b. In this fashion, part 53 of the parabolic contour is positioned radially outward from the tapered section 34b shown by numeral 53 and two sections 54 and 55 of the parabolic contour are positioned radially inward from the outer diameter of the tapered section 34b.

FIG. 13 shows a schematic profile of a fourth embodiment of a tubular body 11(c). The profile of a tapered section 34c intersects the parabola 40 at one point 45 which is inbetween the transition section 36c and the center point 32c. In this fashion, part 47 of the parabola 40 is positioned radially outwardly relative to the tapered section 34c and another part 49 of the parabola 40 is positioned radially inward relative to the outer diameter of tapered section 34c.

The variable diameter driveshafts save a significant amount of weight over conventional driveshafts without degrading the critical speed or torque capacity. The parabolic surface precisely matches the plotted curve of the moment of inertia of the driveshaft at each longitudinal point of the tubular body.

The tapered driveshaft is shaped to conform to the parabola such that the flexural rigidity of the driveshaft is the same at each longitudinal point along the tubular body. In other words, the body is shaped to have uniform strength without a noticeable weak section. The uniformity of strength results in a savings of weight.

In certain applications, the tapered driveshaft eliminates the need for a center bearing and its support structure which is often used to support longer two-piece driveshafts. Consequently, a single tapered driveshaft can eliminate the cost of the bearing and the support structure connected thereto.

The Preferred Method of Manufacturing the Variable Diameter Driveshaft

Figure 2:
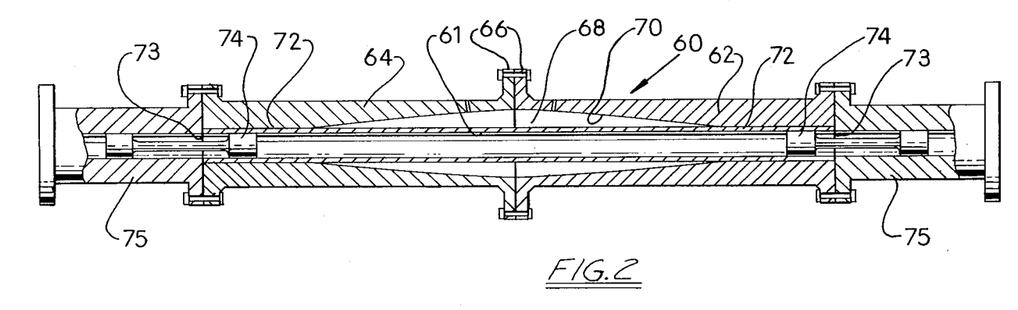
FIG. 2 is a side elevational and cross-sectional view of a cylindrical tube placed within a mold for making a driveshaft according to the invention.

The method of manufacturing the tapered driveshaft is commenced by placing a conventional seamed cylindrical tube 61 in a mold 60 as shown in FIG. 2. The tube 61 is made from steel. The mold 60 has two halves 62 and 64 which are secured together by two center flanges that are bolted together. The mold 60 has a hollow cavity 68 with a tapered wall section 70 and two cylindrical end sections 72. Two opposite open ends 73 of the mold have plungers 74 therein that are hydraulically driven through removable guide pieces 75.

Figure 3:
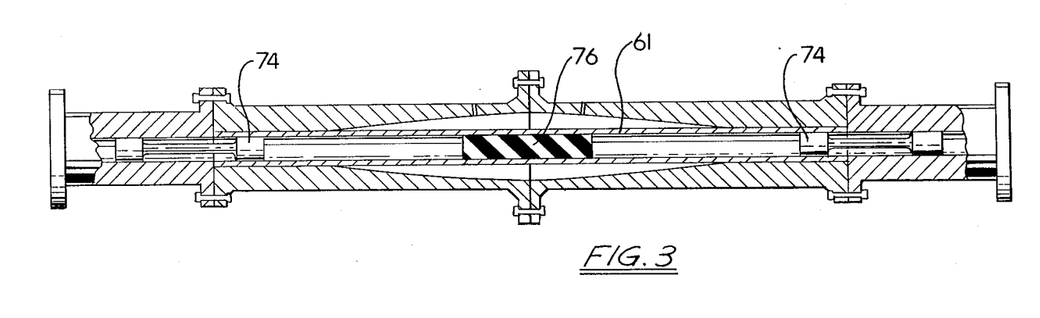
FIG. 3 is a similar view to FIG. 2 showing a short deformable plug positioned within the cylindrical tube.
Figure 4:
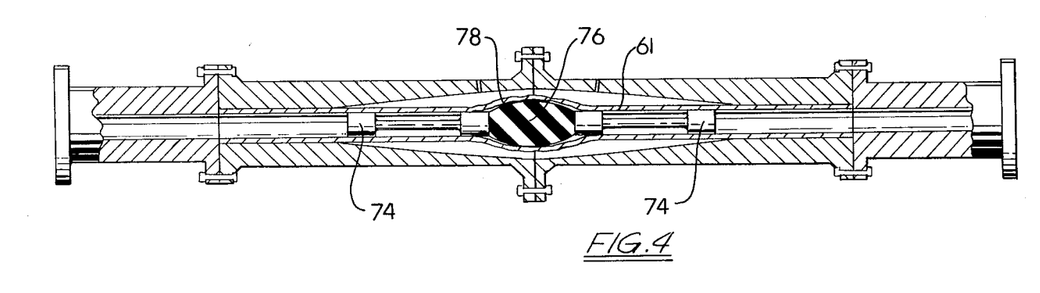
FIG. 4 is a view similar to FIG. 3 showing the short deformable plug being compressed and bulging the center section of the tube radially outwardly.

Formation of the driveshaft body 11 from cylindrical tube 61 can now be shown and described with reference to FIGS. 3 through 8. In FIG. 3, an elastomeric plug 76 is positioned in the center portion of the tube 61 through the open end 73 when one of the guide pieces 75 is removed. The one guide piece 75 is resecured to mold 60. Plungers 74 are, as shown in FIG. 4, driven toward the center to deform the elastomeric plug 76 and create a central bulged area 78 in tube 61. The plungers 74 are then retracted. The elastomeric plug 76 returns to its initial shape, as shown in FIG. 3, and is withdrawn through the one of the open ends 73 of the mold after one of the guide pieces 75 is removed.

Figure 5:
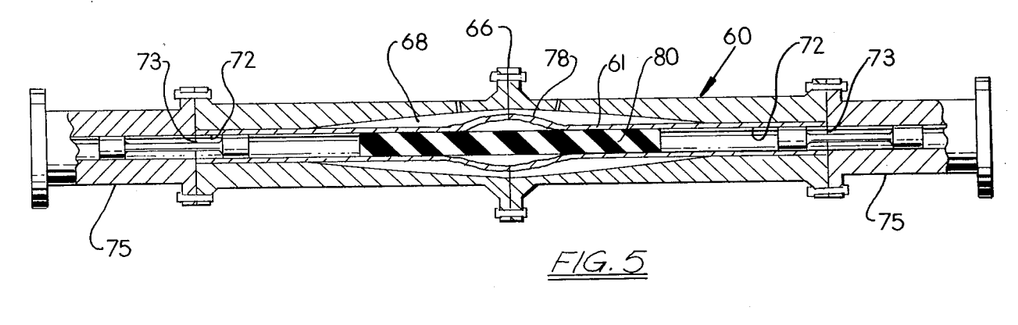
FIG. 5 is a view similar to FIG. 4 showing an intermediate length plug positioned in the partially formed driveshaft body.
Figure 6:
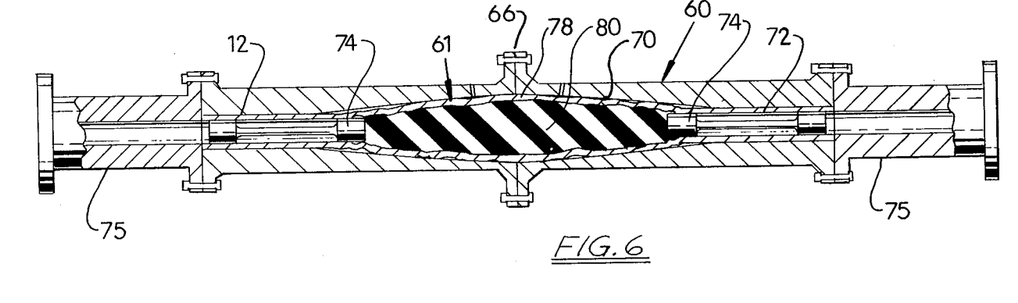
FIG. 6 is a view similar to FIG. 5 showing the intermediate length plug being compressed and further bulging the center section of the tube radially outwardly.

A second intermediate length plug 80 is then positioned in the central deformed portion of the tube 61 and the one-guide piece is resecured to the mold 60, as shown in FIG. 5. As shown in FIG. 6, the plungers 74 are again driven toward the center to deform the center plug 80 and further deform central section 78 outwardly. Deformed central section 78 partially abuts the wall 70 of mold 60. The plungers 74 are withdrawn. Elastomeric plug 80 reverts back to its initial shape, as shown in FIG. 5, and is withdrawn through one of the open ends 73 of the mold 60 after one of the guide pieces 75 is removed.

Figure 7:
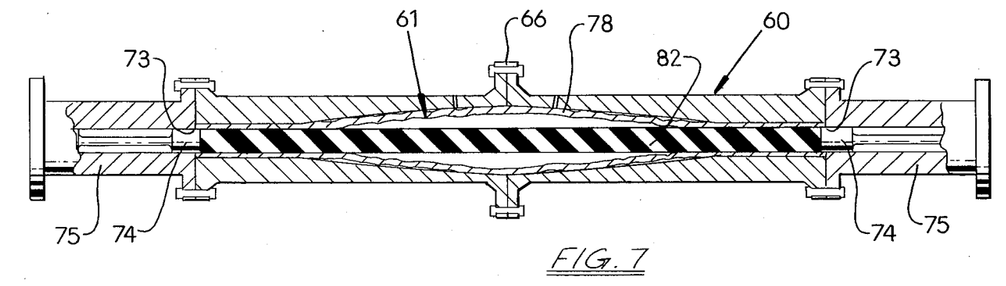
FIG. 7 is a view showing a long elastomeric plug positioned within the substantially formed driveshaft body.
Figure 8:
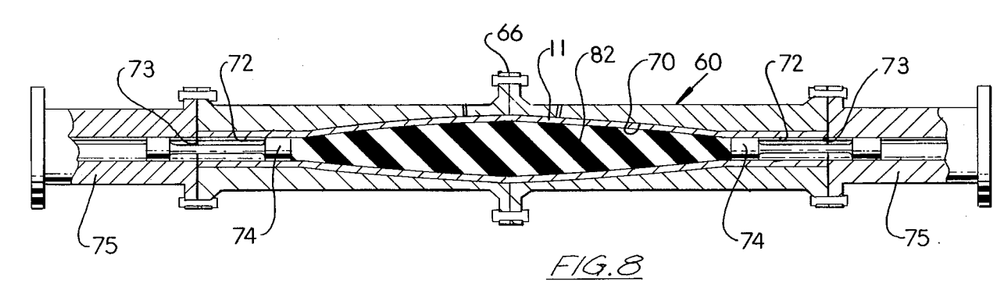
FIG. 8 is a view similar to FIG. 7 showing the long elastomeric plug being compressed and bulging the cylindrical tube wall outwardly until the tube abuts the mold wall.

As shown in FIG. 7, a longer third plug 82 is inserted into the mold and the one-guide piece is resecured to the mold 60. The plungers are again driven toward the center to compress the plug 82, as shown in FIG. 8, to force the tube 61 to closely abut the wall 70 of the mold 60 and to smooth out any wrinkles in the newly-formed tubular body 11. The plungers 74 are then again retracted, elastomeric plug 82 reverts to its initial shape, as shown in FIG. 7, and is withdrawn through one of the open ends 73 of the mold 60 after one of the guide pieces 75 is removed. The mold 60 is then opened and the newly-formed tubular body 11 is ready to be attached to yokes 14 and 24 in a conventional fashion.

It should be noted that the end sections 72 of the mold are cylindrical in shape such that the cylindrical tube ends portions 12 and 22 retain their initial diameter at the end of the molding process to accommodate standard sized yokes 12 and 24 which are commonly attached to conventional shaped driveshaft tubular bodies. The conventional shaped driveshaft tubular bodies. The specific diameter is determined by the specific application and requirements of the particular manufactured driveshaft.

Each plug 76, 80 and 82 is made from a single piece of urethane. The first piece can be approximately 6 inches long for a tubular body that has a length of approximately 60-70 inches. The second piece should be approximately one-half the tubular body length and the third piece 82 should be approximately the length of tubular body. As the central area of the tube 61 is radially increased, the wall thickness of the tube 61 decreases in an inverse relationship.

In this fashion, a tapered driveshaft is manufactured from a seamed cylindrical tube by expanding the diameter of the cylindrical tube in its mid-section without fracturing the tube or creating undue stresses in the tube which can result in failure of the tube.

Variations and modifications of the present invention are possible without departing from the spirit and scope as defined by the appended claims.

The embodiments of the invention in which exclusive property or privilege is claimed are defined as follows:

1. A method of manufacturing a double tapered tubular driveshaft comprising the steps of:
    placing a metal tube in a mold having a double tapered mold wall that converges inwardly toward each of its ends from a larger diameter middle location to lesser diameter end locations;
    positioning an elastomeric deformable plug within said tube, said plug being substantially shorter than said double tapered mold walls;
    compressing said plug to force the middle portion of said plug outwardly and force said tube to bulge radially outwardly;
    positioning a second elastomeric deformable plug within said tube; and
    compressing said second plug to force said second plug to bulge outwardly and exert a force on said tube to cause said tube to bulge further radially outwardly into contact with said wall.

2. A method of manufacturing a tubular tapered driveshaft comprising the steps of:
    placing a metal tube in a mold having a mold wall comprised substantially of a midsection tapered toward opposing ends of said mold;
    inserting an elastomeric deformable cylindrical plug within said tube, said plug being substantially shorter than said midsection;
    positioning said plug near the axial center of said tube and compressing the opposite ends of said plug toward each other to force the middle portion of said tube to bulge radially outwardly;
    removing said plug;
    inserting a longer elastomeric deformable cylindrical plug within said tube; and
    positioning said longer plug toward said axial center of said tube and compressing the opposite ends of said longer plug toward each other to cause further bulging radially outward of the tube to abut the tapered wall of said mold.

3. A method as defined in claim 2 wherein:
    said longer plug is longer than the axial dimension of the tapered wall section of said mold.

4. A method as defined in claim 3 further comprising:
    inserting an intermediate length elastomeric deformable plug after removing said plug;
    driving said intermediate plug toward said axial center of said tube and compressing opposing ends of said plug toward each other to cause additional bulging radially outward to cause said tube to approach said tapered wall; and
    removing said intermediate plug before inserting said longer elastomeric deformable cylindrical plug.

5. A method as defined in claim 2 wherein:
    said mold wall has a profile which approximates a surface of revolution of a parabola over a substantial length thereof.

* * * * *